(No Model.)
P. M. COFFIN.
BOTTLE INDICATOR.
No. 576,658. Patented Feb. 9, 1897.
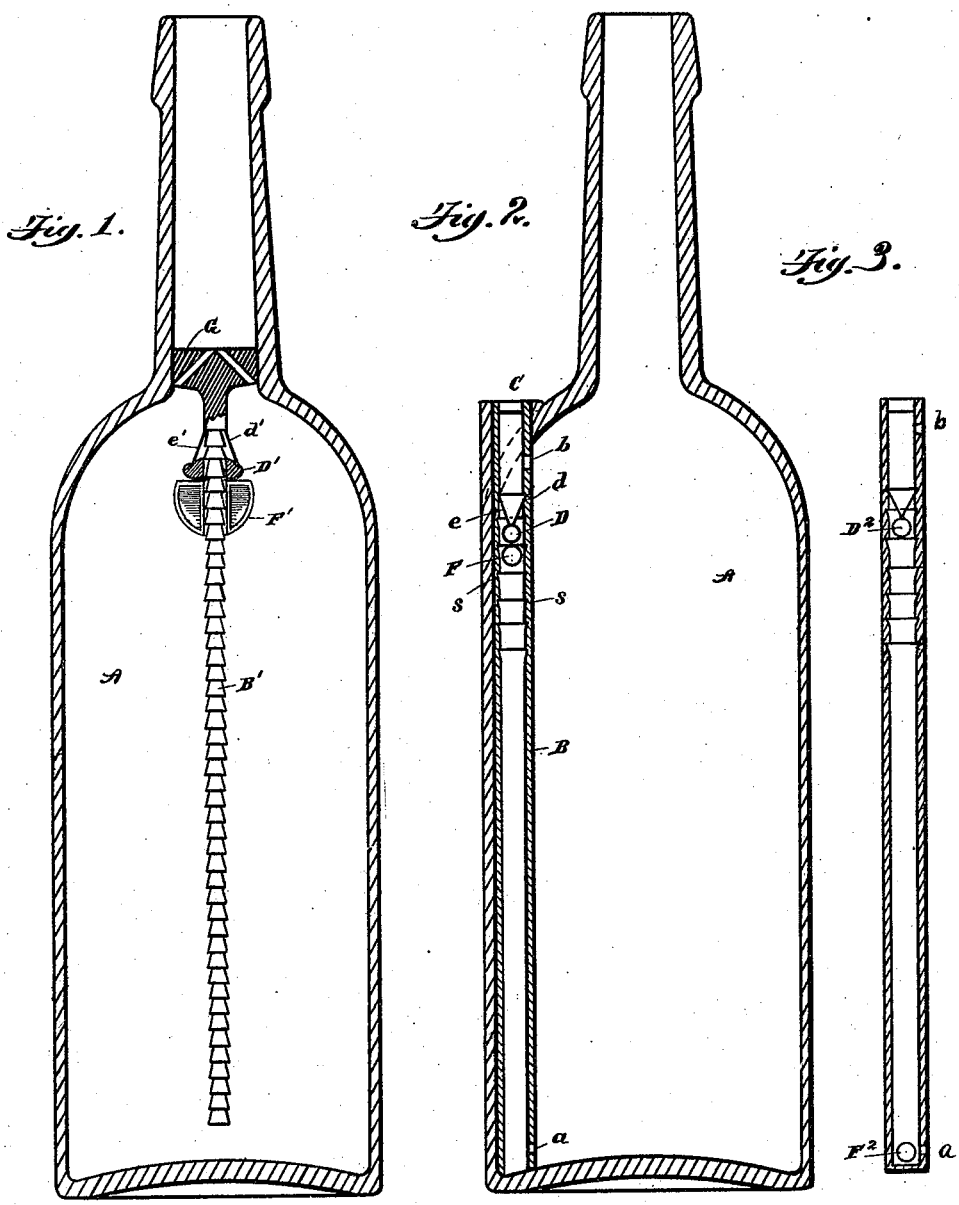
WITNESSES
F. Clough.
L. H. Bradford
INVENTOR
Philip M. Coffin,
By Parker & Burton
Attorneys.

UNITED STATES PATENT OFFICE.

PHILIP M. COFFIN, OF DETROIT, MICHIGAN.

BOTTLE-INDICATOR.

SPECIFICATION forming part of Letters Patent No. 576,658, dated February 9, 1897.

Application filed September 14, 1894. Serial No. 523,009. (No model.)

*To all whom it may concern:*

Be it known that I, PHILIP M. COFFIN, a citizen of the United States, residing at Detroit, county of Wayne, State of Michigan, have invented a certain new and useful Improvement in Registers to Show the Depth to which Liquid has been Drawn from Vessels; and I declare the following to be a full, clear, and exact description of the invention, such as will enable others skilled in the art to which it pertains to make and use the same, reference being had to the accompanying drawings, which form a part of this specification.

This invention relates to registers, and has for its object an improved attachment to be applied to vessels containing liquids, so arranged as to register whenever a portion of the liquid has been taken out or removed from the vessel and to continue to indicate the point to which the liquid has been drawn down, although the vessel may be afterward filled up again, a special object of the device being to prevent the reuse of a vessel, except by the manufacturer or owner of the bottle, after the liquor which was first put into it has been removed or partially removed, the register being adapted to indicate the fact if liquid is poured back into it.

In the drawings the device is shown in two forms, both of which are shown in connection with bottles.

In the drawings, Figure 1 shows the indicator as hollow and arranged to slide on a rod. Fig. 2 shows it as movable on the interior of the tube. Fig. 3 shows a modification of the tubular form.

A indicates the vessel, in which I insert a tube B, which is notched or serrated on its interior. The tube extends from the bottom of the vessel to near the top of it, and may be held in position in any approved way. As shown in the drawings it is indicated as inserted through an auxiliary mouth C, into which it may be sealed, either by melting the glass together or by securing it with a seal the breaking of which would show that the vessel had been tampered with.

Near the bottom and the top of the tubes are preferably small holes $a$ $b$, the hole $a$ at the bottom being intended to permit the liquid to flow into and out of the tube B, but being so small as to cause that flow to be slow.

The hole $b$ is intended as a vent to permit the free access of air above the liquid in the tube B. Within the tube B is placed a registering-weight D, from the top of which spread a pair of springs $d$ $e$, that engage with the serration $s$ on the interior of the tube.

The weight D is regulated with respect to the strength of the springs $d$ $e$ so that the weight and springs will drop downward through the tube B when the weight is not supported by either liquid or by any other support; but it is not sufficient to cause the weight and springs to drop against the support. The weight and tension of the springs can be adjusted so that the liquid bearing against the other side of the weight will form the necessary support; but inasmuch as such an adjustment is delicate I prefer to place under the weight D a float F, which will effectually support the weight above the surface of the liquid or at the height to which it has dropped when liquid has been poured from the vessel.

Whenever liquid is poured from the vessel the surface assumes a new level, the float F drops to the new level, and the weight D also drops to the float, the springs $d$ $e$ yielding to permit the passage downward of the weight. The springs then spring outward again and prevent the weight D from rising should fresh liquid be put into the vessel. The utility of the tube consists in this: If the vessel is canted or tipped upside down, the liquid pours out from the tube so slowly that it has no effect on the indicator D. If the vessel is tipped entirely upside down, the ball F may float away from the indicator, but returns to place when the vessel is righted.

In the form shown in Fig. 1 instead of the tube B, I use a jointed or serrated rod B', and this, if inserted directly under the neck of a bottle, should be protected by a guard G. On this jointed rod B' are placed a perforated weight D' with the springs $d'$ $e'$, and also a detached float F'. The principle in both cases being alike and involving an indicator arranged to be supported at the surface of the liquid will drop as the liquid drops and will be caught at the lowest point at which the liquid drops, and will prevent it from rising.

An important feature of this device is that the vessel with which it is employed is in no wise injured, but by breaking the seal, so that the register can be got at, it can be reset and the vessel can be used again.

In the modification shown in Fig. 3 the register there indicated at D² is made to float, and a loose weight F³, which normally drops to the bottom of the tube, falls against the float when the vessel is reversed, and this prevents the register from moving along the tube in a direction toward its normal bottom during the period of reversal.

What I claim is—

1. The combination with a vessel, a support, a register adapted to move freely down along said support, a catch to prevent the rising of the register, and means adapted to primarily sustain the register at the surface of liquid in the vessel, substantially as specified.

2. An indicator adapted to show the depth to which liquid has been drawn from a vessel, consisting of a serrated support, a register adapted to drop downward along the support and provided with springs adapted to engage the serrations and prevent the register from rising again, and means for primarily supporting the register at the surface of the liquid, substantially as described.

3. In an indicator for showing the depth to which liquid has been drawn from a vessel, the combination of a tube notched or serrated on its interior, and provided with small inlet and outlet holes at its top and bottom, a register adapted to drop downward along the support and provided with springs adapted to engage the serrations and prevent the register from rising again, and means for primarily supporting the register at the surface of the liquid, substantially as described.

In testimony whereof I sign this specification in the presence of two witnesses.

PHILIP M. COFFIN.

Witnesses:
CHARLES F. BURTON,
EFFIE I. CROFT.